UNITED STATES PATENT OFFICE.

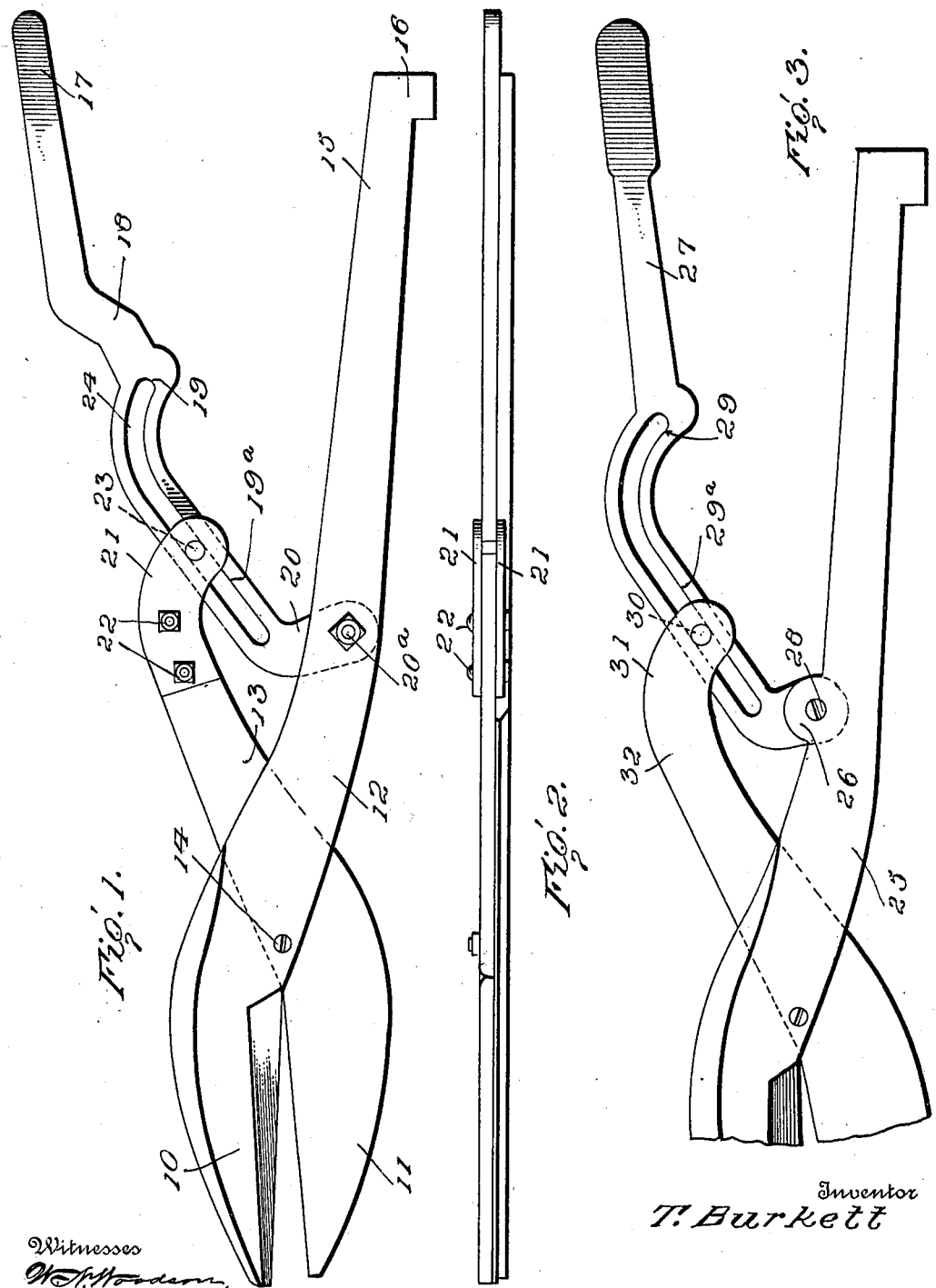

THOMAS BURKETT, OF AUSTIN, TEXAS, ASSIGNOR OF ONE-HALF TO J. I. ZIGLER, OF AUSTIN, TEXAS; SARAH BURKETT ADMINISTRATRIX OF SAID THOMAS BURKETT, DECEASED.

SHEARS.

993,646.  Specification of Letters Patent.  Patented May 30, 1911.

Application filed December 7, 1909. Serial No. 531,786.

*To all whom it may concern:*

Be it known that I, THOMAS BURKETT, a citizen of the United States, residing at Austin, in the county of Travis and State of Texas, have invented certain new and useful Improvements in Shears, of which the following is a specification.

This invention relates to shears, having particular reference to such devices as are employed by metal workers.

The invention has for an object to provide a pair of shears with means whereby an even cut may be maintained during the cutting action as the cutting proceeds from the throat of the shears to the extremities of the blades, and which at the same time increases in leverage toward the ends of the blades in order to obviate the necessity of greater pressure upon the operating handles.

The invention further aims to provide a pair of shears which are comparatively of simple structure and which may be formed without any unnecessary addition of parts to render the same cumbersome and hard to manipulate.

For a full understanding of the invention reference is to be had to the following description and accompanying drawings, in which:—

Figure 1 is a side elevation of the improved shears. Fig. 2 is a top plan view of the same, and Fig. 3 is a slightly modified form of the shears.

Corresponding and like parts are referred to in the following description and indicated in all the views of the drawing by the same reference characters.

Referring to the drawing in which is disclosed the improved shears, the numerals 10 and 11 designate the jaws which are preferably provided with straight cutting edges. The jaws 10 and 11 form the forward extremities of the crossed shanks 12 and 13 which are pivoted together upon the pin 14. The shank 12 is elongated to provide a handle 15 carrying a depending lug or rest 16 in the usual manner. A handle-lever 17 has its inner end curved toward and pivoted upon the longer shank 12. The lever 17 is provided with an offset portion 18 midway of its ends to space the outer end of the lever 17 from the handle 15 to accommodate the fingers of the operator. The handle-lever 17 is provided with an arcuate portion 19 at its inner end merging into a straight portion 19$^a$ which is curved inwardly toward the shank 12 providing a pivotal tongue 20. A bolt 20$^a$ passes through the tongue 20 to hingedly support the lever 17. The shorter shank 13 is forked at its inner end by disposing a pair of plates 21 against its opposite sides and clamping the same in position by bolts 22. The plates 21 are preferably provided between their outer ends with a roller 23.

From Fig. 1 it will be observed that the slot 24 is curved at its outer end toward the longer shank and that the straight portion is arranged out of line with the pivotal center of the lever 17.

From Fig. 3 it will be noted that in the slightly modified form the lower shank 25 is provided adjacent its rear end with a lug 26 extending upwardly therefrom to which the lever 27 is pivotally secured by a bolt 28. In this instance the lever 27 is provided with an arcuate portion 29 and a straight portion 29$^a$ having a longitudinal slot formed therein for the reception of the roller 30 which is carried between the fork arms 31 rearwardly extending from the upper shank 32 of the shears.

From the construction set forth it will be noted that when the lever 17 is drawn into a downward position against the handle 15 that the roller 23 will be caused to move within the slot 24 and toward the bolt 20$^a$. The disposition of the slot 24 is such that the fulcrum of the shank 13 is moved inwardly at a constant rate as the lever 17 is drawn downwardly, and that therefore an even movement of the jaws 10 and 11 is insured throughout the entire lengths of the cutting blades.

The curved portion of the slot 24 provides the initial slow movement of the jaws while the straight portion thereof insures a steady cam action of the portion 19$^a$ of the lever 17 with respect to the roller 23. This causes the steady cutting action of the jaws 10 and 11 and admits of the application of a constant pressure upon the handle 17. It will be further noted that the roller 23 is retained in constant action during the movement of the lever 17 as the slot 24 is inclined with respect to the shank 12 at all positions of the lever 17 and therefore forces the roller 23 into a new position at each point to which the lever 17 is moved.

The device is also adapted to be employed as an attachment to shears by simply shortening one of the shanks, as 13, and applying the plates 21 against the opposite sides thereof. The opposite shank of the shears as 12, is apertured for the reception of the bolt 20ᵃ to support the inner end of the lever 17. In this construction it is readily observed that the attachment may be applied to various shears irrespective of the form of the jaws of the same, the provision of the shanks 12 and 13 being necessary only for supporting the attachment.

Having thus described the invention what is claimed as new is:—

Shears including crossed shanks pivoted together and having coöperating jaws upon their outer ends, one of the shanks being elongated to provide a handle and the shorter shank having a forked end, a handle-lever having its inner end curved toward and pivoted to the longer shank, said lever having in its inner portion a straight slot curved at its outer end toward the longer shank, and a pivot-pin carried in the fork of the shorter shank and passing through the slot.

In testimony whereof I affix my signature in presence of two witnesses.

THOMAS BURKETT. [L. S.]

Witnesses:
A. H. DANLEY,
W. M. ROGERS.

---

Copies of this patent may be obtained for five cents each, by addressing the "Commissioner of Patents, Washington, D. C."